(No Model.)
S. TAYLOR.
SIPHON BOTTLE.
No. 554,154.  Patented Feb. 4, 1896.
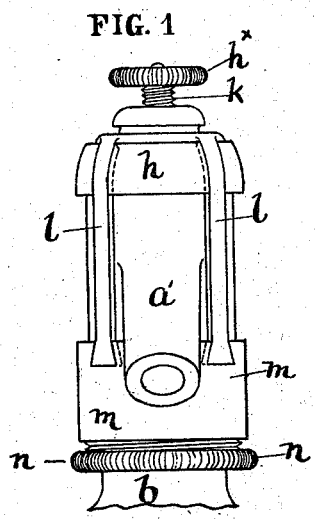
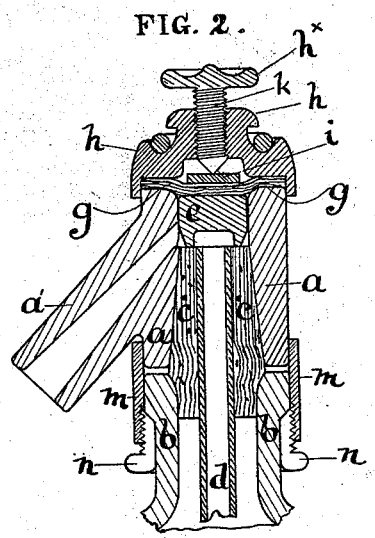
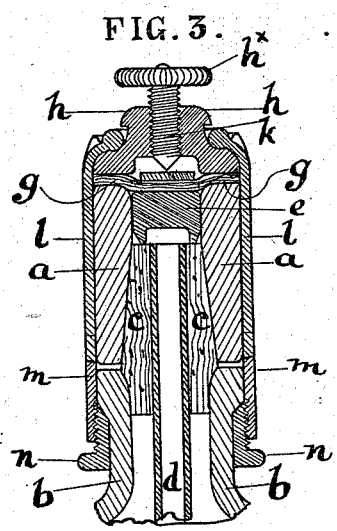
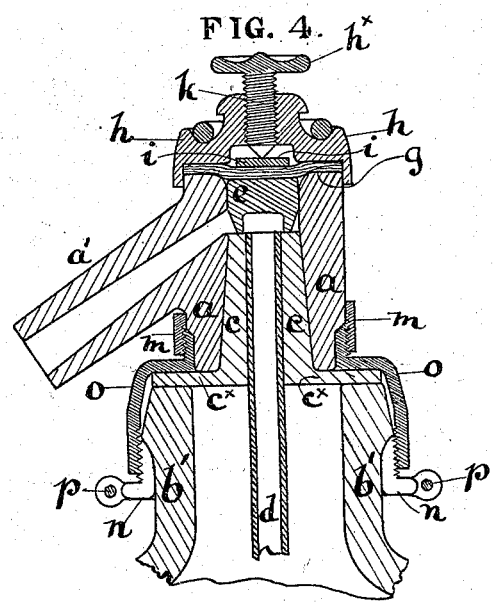
Witnesses:
E. J. Griswold
L. Wenke
Inventor:
Samuel Taylor
By his Attorneys
Howson and Howson

UNITED STATES PATENT OFFICE.

SAMUEL TAYLOR, OF MANCHESTER, ENGLAND.

SIPHON-BOTTLE.

SPECIFICATION forming part of Letters Patent No. 554,154, dated February 4, 1896.

Application filed September 27, 1895. Serial No. 563,848. (No model.)

*To all whom it may concern:*

Be it known that I, SAMUEL TAYLOR, a subject of the Queen of Great Britain and Ireland, residing at Whalley Range, Manchester, in the county of Lancaster, England, have invented Improvements in or Applicable to Siphon-Bottles and Seltzogenes, of which the following is a specification.

This invention relates to siphon-bottles and seltzogenes for the storage and manufacture of aerated liquids, the objects of the invention being to insure perfect cleanliness and purity and to prevent the possibility of the liquid contents coming into contact with any metallic substance and thus causing corrosion or galvanic action and at the same time to obtain a gas and liquid tight valve and to cheapen and simplify the manufacture of the heads of such siphon-bottles and seltzogenes.

The nature of my said invention and the manner in which the same is to be performed will be readily understood on reference to the annexed sheet of drawings and the following explanation thereof.

Figure 1 is a front elevation of the upper part of a siphon-bottle constructed according to my invention. Fig. 2 is a vertical section of the same, taken through the center of the nozzle; and Fig. 3 is also a vertical section, but taken at an angle of about forty-five degrees to Fig. 2. Fig. 4 is a similar view to Fig. 2 of the upper part of a seltzogene constructed according to the same invention.

I make the removable top or head of the siphon-bottle (see Figs. 1, 2 and 3) and the spout or delivery-nozzle both of one piece of molded glass, and as in the case of a siphon-bottle no provision has to be made for the removal of the top or head and delivery-tube each time that the bottle has to be recharged, I form the glass top or head and I connect the same to the siphon-bottle as hereinafter described.

I form the top or head $a$ and the nozzle $a'$ of one piece of molded glass, the head being externally of cylindrical form and of about the same diameter as the mouth of the bottle $b$, the bore being cylindrical at the top and coned out gradually toward the bottom, as shown at Figs. 2 and 3, to receive the upper part of a double-coned bush or hollow plug $c$ of india-rubber or other suitable substance.

This double-coned bush or plug $c$ performs three separate functions. In the first place, its upper surface, which I prefer to make of harder rubber than the remainder, serves as a seating for the glass valve hereinafter described; secondly, it holds the glass delivery-tube $d$ firmly in its place, and, thirdly, it not only makes a perfectly gas and liquid tight joint between the tube $d$ and the removable glass top or head $a$, but also between the latter and the mouth of the bottle $b$.

The valve $e$ I make of glass or other non-metallic material fitting loosely in the upper or cylindrical part of the bore of the top or head $a$, so that the valve shall be able to rise and fall vertically, its lower face being made with a central recess, having a projecting rim all around, which latter forms a gas and liquid tight joint on being pressed down on the upper surface of the coned bush or hollow plug $c$.

Above the glass or other valve $e$ is a disk or diaphragm $g$ of india-rubber or other suitable elastic substance, the outer edge of which is held firmly between the upper surface of the removable glass top or head $a$ and a cap $h$, hereinafter described. This elastic disk or diaphragm makes a perfectly gas and liquid tight joint above the valve $e$. At the same time it allows the valve to rise and fall as required.

Above the elastic diaphragm $g$ is a metal or other hard disk $i$, against which works the point of a screw $k$, which screw passes through the center of the cap $h$ and is provided with a milled head $h^+$ or other means whereby it can be turned by hand so as to screw down the valve $e$ or release the same.

Attached to the cap or cover $h$ by vertical bars $l$ is a complete metal ring or band $m$ placed below the spout or nozzle $a'$ and having its lower part made with a screw-thread on the inside, whereby the removable glass top or head $a$ and the cap or cover $h$ can be secured together and at the same time fixed onto the mouth of the siphon-bottle $b$ by screwing up the threaded ring or nut $n$, which is divided vertically into two parts, so that it can be placed around the neck of the bottle $b$ and united in the known manner. It will be seen that the turning of this threaded ring or nut $n$ not only fixes the removable glass head $a$ onto the mouth of the bottle $b$, but it also draws all the parts firmly and solidly together, thus making all the joints perfectly gas and liquid tight.

The ring or band $m$ covers the joint between the lower edge of the body $a$ and the mouth of the siphon-bottle $b$.

In adapting my invention to a seltzogene (see Fig. 4) where it is necessary to remove the glass top or head $a$ with the delivery-tube $d$ each time that the vessel is to be charged, I preferably make the coned bush or hollow plug $c$ with a flange $c^+$ instead of its lower coned part, and I fix by screwing or otherwise to the ring or band $m$ a cap $o$ of a sufficient diameter to embrace the top $b'$ of the seltzogene-bottle, and I prefer to make the two halves of the divided ring or nut $n$ with lugs whereby the two parts can be united by screws $p$, so that they virtually become one solid ring, which always remains on the neck $b'$ of the bottle and is capable of being turned around so as to couple the body $a$ and bottle $b'$ together and uncouple the same.

The head $a$ is not revolved but merely placed on the top of the bottle-neck and coupled or uncoupled by turning the screwed ring or nut $n$. The outside of this ring may be milled or roughened or provided with projections or otherwise so formed on the exterior that it can readily be turned by hand.

Having now particularly described and ascertained the nature of my said invention and in what manner the same is to be performed, I declare that I make no general claim to the manufacture of the tops or heads of siphon-bottles or seltzogenes of molded glass *per se*, nor do I claim separately any of the various parts or details; but

What I claim is—

In combination with the glass head of a siphon or seltzogene, a screw-down valve made of glass or equivalent material provided with an elastic diaphragm and a metal or other hard disk between the point of the screw and the top of the valve, a coned bush of india-rubber or other suitable elastic substance so formed and applied as to act at the same time as a seating to the glass valve, a gas and liquid tight packing, and a holder for the glass discharge-pipe, and a metallic cap or cage for connecting the parts together and fixing them onto the bottle, all respectively constructed attached and operating substantially in the manner and for the purposes hereinbefore described and illustrated by the drawings annexed.

In testimony whereof I have signed my name to this specification in the presence of two subscribing witnesses.

SAMUEL TAYLOR.

Witnesses:
CHARLES A. DAVIES,
JNO. HUGHES.